(12) United States Patent
Shetty et al.

(10) Patent No.: US 6,554,943 B2
(45) Date of Patent: Apr. 29, 2003

(54) FLAKES FROM MULTILAYER IRIDESCENT FILMS FOR USE IN PAINTS AND COATINGS

(75) Inventors: Ramakrishna Shetty, Pelham, NY (US); Scott I. Allen, East Fish Kill, NY (US)

(73) Assignee: Engelhard Corporation, Iselin, NJ (US)

( * ) Notice: Subject to any disclaimer, the term of this patent is extended or adjusted under 35 U.S.C. 154(b) by 179 days.

(21) Appl. No.: 09/838,001

(22) Filed: Apr. 19, 2001

(65) Prior Publication Data

US 2001/0016250 A1 Aug. 23, 2001

Related U.S. Application Data

(62) Division of application No. 09/108,269, filed on Jul. 1, 1998, now Pat. No. 6,291,056.

(51) Int. Cl.$^7$ ................................................. B32B 7/02
(52) U.S. Cl. .............................. 156/244.19; 156/244.11; 156/247
(58) Field of Search ........................... 156/244.11, 247, 156/289, 244.24, 244.19; 264/173.16

(56) References Cited

U.S. PATENT DOCUMENTS

| | | | | |
|---|---|---|---|---|
| 4,162,343 A | * | 7/1979 | Wilcox et al. | 106/417 |
| 4,310,584 A | * | 1/1982 | Cooper et al. | 428/212 |

* cited by examiner

*Primary Examiner*—Jeff H. Aftergut
*Assistant Examiner*—Barbara J Musser
(74) *Attorney, Agent, or Firm*—Dickstein, Shapiro, Morin & Oshinsky, LLP.

(57) ABSTRACT

Comminuted particles of iridescent laminate film are prepared by supporting the film on a strippable substrate prior to the processing of the film into particulate form.

5 Claims, No Drawings

ABSTRACT# FLAKES FROM MULTILAYER IRIDESCENT FILMS FOR USE IN PAINTS AND COATINGS

This is a division of application Ser. No. 09/108,269, filed Jul. 1, 1998 now U.S. Pat. No. 6,291,056.

BACKGROUND OF THE INVENTION

The present invention relates to flakes from multilayer iridescent films for use in paints and coatings.

Multilayer plastic films which have alternating layers of two polymers of different refractive indexes are iridescent when those individual layers are of suitable optical thickness. The iridescent color is produced by the phenomenon of light interferences. The pair of alternating polymers constitute the optical core. Usually, the integral outermost layers or skin layers are thicker than the layers in the optical core. This thicker skin may consist of one of the components in the optical core or may be a different polymer which is utilized to impart desired permanent physical, mechanical or other properties to the film. The multilayer structure is conveniently produced by a coextrusion process. Such films are described in Re U.S. Pat. No. 31,780 to Cooper, Shetty and Pinsky, and U.S. Pat. Nos. 5,089,318 and 5,451,449, both to Shetty and Cooper which are hereby incorporated by reference, and other patents.

The known laminate iridescent films have been used to prepare flakes which can be used to produce a "sparkle" appearance in a variety of applications but have not been used in coating compositions such as, for example, automotive clear coat-base coat systems because of limitations on the particle thickness and size obtainable with such known iridescent films. Such size limitations are due to the fact that the production of flakes is subject to competing requirements. The iridescent films need to be brittle so that they can be cut into flakes but at the same time, they require sufficient physical properties to permit handling on the production machinery which makes the flakes.

As a practical matter, the iridescent laminate film flakes are made by cutting the films using precision cutting machinery. The machines used to precision cut iridescent laminate films are web fed and can only take widths narrower than 5.5 inches (ca 14 cm). Therefore, the iridescent laminate films have to have sufficient physical properties so as to be able to be made as a wide web on the coextrusion equipment and then be slit into narrower webs (5.5 inches or narrower) and rewound. These narrow rolls are, subsequently, unwound and fed into the cutting machines. To satisfy competing demands, it has been found necessary that the films from which the flakes are made have a minimum thickness of 1 mil (25.4 microns) and that the shortest edge dimension of the flakes made be approximately 4 mils (101 microns) or greater.

It was thought possible to produce particles smaller than 4 mils (101 microns) from films thinner than 1 mil (25.4 microns) through a milling or grinding operation but it was found that the laminate film products currently produced are not sufficiently brittle to be milled or ground. Unfortunately, those film formulation which are brittle enough to be milled or ground cannot be coextruded because the laminate film breaks at some point during the web handling and winding process.

An iridescent laminate film product capable of being size reduced and a process to accomplish this size reduction is therefore still needed. The present invention addresses this need.

SUMMARY OF THE INVENTION

The present invention relates to comminuted particles of iridescent laminate films and their production. More particularity, it relates to particles produced by temporarily supporting the laminate film on a stripable substrate and thereafter removing the support and comminuting the laminate film.

As a result of the invention, it is now possible to make the flakes from laminate films which have a thickness of less that 1 mil (25.4 microns), preferably about 0.25–0.75 mil, and for the flakes made to have a longest edge dimension of less than approximately 4 mils (101 microns), preferably about 0.2–3.8 mils. In those instruments that measure particle size using a spherical model, the longest edge dimension is reported as a diameter and in that case, the diameter will be less than about 150 microns and preferably about 7 to 135 microns.

DESCRIPTION OF THE INVENTION

In accordance with the present invention, there is provided a supported thermoplastic resinous multilayer laminate film of a plurality of very thin layers of substantially uniform thickness, the layers being generally parallel and the contiguous adjacent layers being of different transparent thermoplastic resinous materials. The multilayer laminate film is supported on a carrier layer and adhered thereto such that the support layer can be readily stripped from the film.

The multilayer laminate film preferably has at least 10 of the very thin layers, more preferably at least 35 and most preferably at least 70. The individual layers generally have a thickness of about 30 to 500 nm.

The adjacent layers of the laminate film preferably differ in refractive index by at least about 0.03 and more preferably by at least about 0.06.

Any transparent thermoplastic resinous materials can be used in the present invention. The preferred transparent thermoplastic resinous materials of the laminate film are polyethylene terephthalate (PET), polymethyl methacrylate (PMMA), polybutylene terephthalate (PBT), glycol modified polyethylene terephthalate (PETG) and polystyrene (PS). Combinations which can be employed include PMMA/PBT, PMMA/PET and PMMA/PS.

One of the advantages of the present invention is that combinations which would otherwise be too brittle to be handled conveniently can now be easily employed. Some film formulations are not brittle but elongate when cutting is attempted, thereby making it difficult or impossible to comminute into flakes. Another advantage of the invention is that it allows laminate film formulations which have very low elongation to be size reduced to the desired particle sizes by precision cutting or possibly by milling.

The carrier can be any material which is weakly adherent to the iridescent laminate film such as, for instance, a polymer support, metallic support, and the like. The carrier is applied in any convenient thickness on one surface of the multilayer laminate film to permit it to be produced in wide lengths, trimmed and slit into narrow lengths (when precision cutting is contemplated) and wound into rolls. Application can be by coextrusion with the iridescent laminate film or the laminate film can be extruded onto a solid carrier web or by any other convenient means. The only requirement is that the carrier not have an adverse effect on the multilayer laminate film and be weakly adherent to the iridescent laminate film. By weakly adherent is meant that the support layer can be readily stripped from the laminate film at an appropriate time, e.g. on a slitter/rewinder.

The carrier is preferably a polymer and the polymer is preferably a polyolefin, which may be thermoplastic and may be transparent or opaque. The polyolefin is preferably coextrudable with the laminate film, an attribute which facilitates the production process. Typical polyolefins include high density polyethylene, low density polyethylene, LLDPE, polypropylene, and the like. Polymers other than polyolefins, such as polyesters, can also be used.

The following examples are illustrative:

EXAMPLE 1

Polyethylene terephthalate (PET) thermoplastic polyester was fed to the feedblock from one extruder and polymethyl methacrylate (PMMA) from a second extruder to form a 115 layer optical core, and a layer (about 20% of the total thickness) of polyethylene was added to one surface by means of a third extruder to form a 0.73 mil (18.5 micron) thick laminate iridescent film. The laminate film after stripping the polyethylene layer was brightly iridescent and was prevailing red and green when seen by reflection at perpendicular incidence, and blue and pink when seen by transmission at perpendicular incidence.

The supported multilayer laminates iridescent film was comminuted as follows. First, the carrier web and the iridescent laminate film were separated from one another. The separated film was then cut into flakes in a Granulator and then milled with cooling. The flakes could be used in any application where a "sparkle" appearance was desired. For instance, they can be incorporated into either or both of the clear coat and base coat of an automotive coating system and either of these coatings has have additional colorants therein.

EXAMPLE 2

A multilayer laminate structure with the same polymers in the optical core as in Example 1 is prepared and flaked as there described except that the optical core had 99 layers.

EXAMPLES 3–7

The procedure of Example 1 was repeated with the following materials:

| Example | Total No. of Layers | High Index Polymer | Low Index Polymer | Support Layer Polymer |
| --- | --- | --- | --- | --- |
| 3 | 116 | PET | PMMA | Polypropylene |
| 4 | 116 | PS | PMMA | Polyethylene |
| 5 | 116 | PBT | PMMA | LLDPE |
| 6 | 116 | PETG | PMMA | Polypropylene |
| 7 | 116 | PET | PMMA | Polyethylene |

Various changes and modifications can be made in the present invention without departing from the spirit and scope thereof. The various embodiments which have been described herein were for illustration purposes only and were not intended to be limiting on the present invention.

What is claimed is:

1. A process for producing iridescent laminate films suitable for comminution comprising providing a transparent thermoplastic laminate film of at least 10 coextruded very thin layers of substantially uniform thickness, said layers being generally parallel, the contiguous adjacent layers being of different transparent thermoplastic resinous materials whose index of refraction differs by at least about 0.03 and releasably bonded said film to a supporting substrate; delaminating said supporting substrate and said laminate film; and comminuting said laminate film into a plurality of particles whose largest edge dimension is less than about 4 mils and whose thickness is less than about 1 mil.

2. The process of claim 1, wherein said supporting substrate is a polyolefin.

3. The process of claim 1, wherein said supported laminate film is cut to a width of not greater than about 5.5 inches prior to said separating step.

4. The process of claim 1, wherein at least one of said resinous materials is selected from the group consisting of polyethylene terephthalate, polymethyl, methacrylate, polybutylene terephthalate, glycol modified polyethylene terephthalate, and polystyrene, and wherein the contiguous adjacent layers of different transparent thermoplastic resinous materials have an index of refraction which differs by at least about 0.06.

5. The process of claim 1, wherein one of said resinous materials is polymethyl methacrylate and the other resinous material is selected from the group consisting of polyethylene terephthalate, polybutylene terephthalate, and polystyrene.

* * * * *